Dec. 14, 1965  T. H. PURCELL, JR  3,223,558
METHOD OF ASSEMBLING AND SEALING AN
ELECTRIC STORAGE BATTERY CELL
Filed March 5, 1963

United States Patent Office 3,223,558
Patented Dec. 14, 1965

3,223,558
METHOD OF ASSEMBLING AND SEALING AN ELECTRIC STORAGE BATTERY CELL
Thomas H. Purcell, Jr., Raleigh, N.C., assignor to The Electric Storage Battery Company, a corporation of New Jersey
Filed Mar. 5, 1963, Ser. No. 262,924
4 Claims. (Cl. 136—168)

This invention relates to a sealed electric storage battery cell and a method for preparing it. In particular, this invention relates to a method for assembling a sealed electric storage battery cell which prevents contamination of electrode lug wires by the electrolyte and thereby provides an improved seal.

In prior art methods for assembling sealed electric storage battery cells, particularly those utilizing an alkaline electrolyte (potassium hydroxide), it is necessary to pot seal the cells in a sequential operation, i.e. the cell is sealed in several stages. During the sequential sealing operation, it is difficult to prevent the electrolyte from contaminating the electrode lug wires which prevents forming a good seal about the electrode lug wires. In addition, it has been found very difficult to form a tight seal around the bunched electrode lug wires where they protrude from the cell container.

It is an object of this invention to provide a sealed storage battery cell having a structure which improves the quality of the seal obtainable therein.

Another object of the invention is to provide a method for assembling sealed storage battery cells which prevents electrolyte contamination of the electrode lug wires.

Still another object is to provide an improved method for sealing electrode lug wires as they protrude in bunches from cell containers. A further object of this invention is to provide a method for assembling sealed electric storage battery cells which permits the escape of air entrapped in the cell during the sealing operation.

Other objects and purposes of this invention will be apparent to those skilled in the art in view of the following description, and with particular reference to the drawings in which.

It has been discovered that an improved seal can be formed around electrode lug wires which protrdue from a cell container by bending adjacent lug wires in substantially opposite directions as they protrude from the container and then sealing the wires with a sealant. The bending of the adjacent wires in substantially opposite directions permits the sealant to coat each individual wire and thereby prevents leakage between adjacent wires. If the lug wires are sealed in groups as they protrude from the cell container, it is virtually impossible to prevent cracks and spaces between the wires through which electrolyte could leak.

In accordance with the preferred embodiment of this invention, the electrode lug wires protrude through a slot in the upwardly inclined top cover plate of the cell, i.e. the cover plate is upwardly inclined from the container sides to form an apex at the center of the cell where the fill hole is located, where the lug wires are spread and individually coated with a flexible sealant. After the lug wires are spread and coated, a seal housing is cemented in place, forming a space around the lug wires which project through the top of the housing. Then the lug wires are permanently and tightly sealed by filling the housing with a liquid sealant such as an epoxy resin. After the sealant in the housing has set up, the cell may be filled with the desired amount of electrolyte and then sealed by admitting sufficient liquid sealant through the fill hole in the top cover plate to completely fill the volume between the top of the electrolyte and the top cover plate. Thereafter, the fill hole cover may be cemented in place.

As previously indicated, the top cover plate of the cell is upwardly inclined to form an apex at the fill hole. This feature of the invention functions to permit air entrapped in the cell to rise up through the sealant before it sets, continue upwardly along the under side of the top cover plate and escape into the atmosphere through the fill hole. The angle of the cover plate incline is not critical but should be sufficient to permit passage of entrapped air to the fill hole. The angle of the incline may also be limited by design and space requirements.

The cell structure and assembly technique of this invention makes it possible to completely seal the electrode lug wires prior to filling the cell with electrolyte. This prevents contamination of the electrode lug wires by electrolyte which causes leaks and thereby provides a tighter seal.

Figure 1:
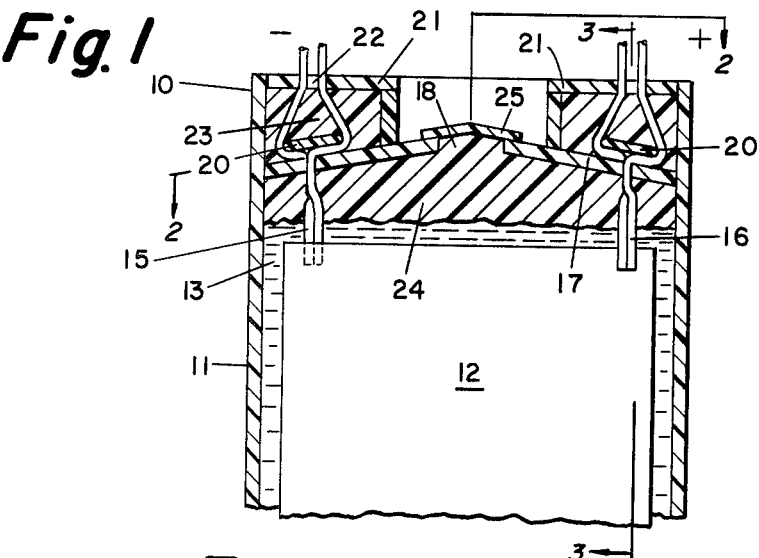
FIGURE 1 is a sectional front view of a portion of a sealed electric storage battery cell prepared in accordance with this invention.

A more detailed description of a preferred embodiment of this invention is presented in the drawings in which FIGURE 1 is a sectional front view of a portion of a sealed electric storage battery cell 10 prepared in accordance with this invention. The sealed electric storage battery cell comprises a plastic container 11, electrodes designated generally by the numeral 12 and electrolyte 13. The particular cell illustrated contains 4 negative electrodes (not shown) and 4 positive electrodes 14 depicted in FIGURE 3, though more or less electrodes per cell may be used. In addition, FIG. 3 also illustrates separators 26 interposed between the positive and the negative electrodes. Leading from each negative electrode are one or more lug wires 15, and also one or more lug wires 16 leading from each positive electrode. The lug wires protrude through a top cover plate 17 which is upwardly inclined toward an apex at the fill hole 18. The top cover plate is slotted 19 as clearly shown in FIGURE 2 to facilitate alignment of the lug wires and to prevent cementitious sealant from dripping into the cell.

Figure 2:
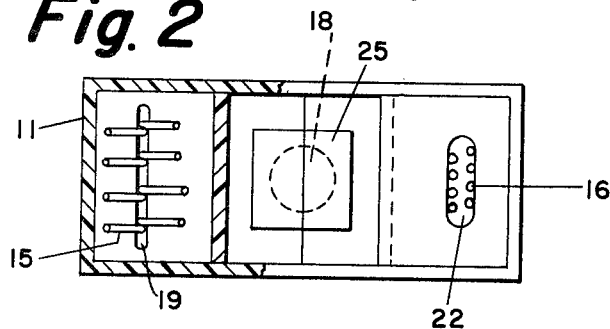
FIGURE 2 is a top view taken along line 2—2 of FIGURE 1.
Figure 3:
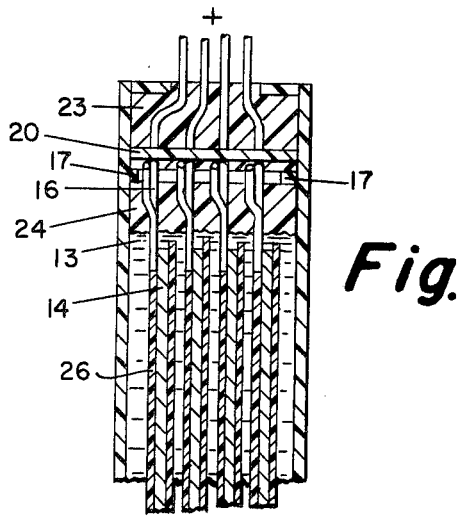
FIGURE 3 is a side view taken along line 3—3 of FIGURE 1, with the negative electrodes and separators omitted for clarity.

As the lug wires protrude through the cover plate, they are spread apart by bending adjacent wires in substantially opposite directions as clearly illustrated in FIGURE 2 with the negative lug wires 15. After the lug wires are spread, they are coated with a cementitious sealant and a plastic strip support 20 may be placed thereon to hold the wires in place and to act as an additional sealant. If the plastic strip support and the sealant are both transparent, the individual seals about each of the lug wires may be visually inspected after the sealing operation. Then seal housings 21 are cemented onto the container and the top cover plate, which housing encloses the lug wires protruding through the cover plate. The lug wires project through a slot 22, or other suitably shaped opening in the top of the housings through which cementitious sealant 23 may be poured to fill the seal housings and encapsulate the lug wires.

After the lug wires have been sealed in the housings, the required amount of electrolyte 13 may be introduced into the cell through fill hole 18. Then a liquid plastic sealant 24 which has a lower specific gravity than the electrolyte is poured into the cell in an amount sufficient to substantially fill the cell up to the cover plate. After the sealant has set, a fill hole cover 25 may be cemented in place. If desired, the space above the fill hole cover and between the seal housings may be filled with additional sealant to insure the tightness of the seal, though it may be left unsealed in order to save weight.

The structure and assembly technique of this invention is applicable to all types of sealed cells including cells using either acid or alkaline electrolyte. The invention is particularly applicable to alkaline cells having silver-zinc, silver-cadmium or nickel-cadmium electrodes.

Having completely described this invention, what is claimed is:

1. A method for assembling and sealing a sealed electric storage battery cell which comprises inserting an electrode pack in a container, said electrode pack comprising positive electrodes and negative electrodes with separators interposed, attaching a top cover plate to said container in such a manner that lug wires leading from each of the positive electrodes protrude through one opening in the top cover plate and lug wires leading from each of the negative electrodes protrude through another opening in the top cover plate, spreading said lug wires as they protrude through the top cover plate, applying a sealant to the spread lug wires which coats each individual lug wire and substantially closes the openings in the top cover plate through which the lug wires protrude, attaching two seal housings to the container and the top cover plate in such a manner that each set of lug wires protruding through the top cover plate is enclosed by one of the seal housings, said lug wires projecting through an opening in the top of each seal housing, substantially completely filling each seal housing with a sealant, filling the cell with the desired amount of alkaline electrolyte through a fill hole in said top cover plate, and thereafter completely sealing the cell by introducing into the cell a sealant having a lower specific gravity than the alkaline electrolyte through said fill hole in the top cover plate.

2. A method in accordance with claim 1 in which the top cover plate is attached to the container in such a manner that it is upwardly inclined from the container sides to form an apex at the center of the cell where the fill hole is located in the top cover plate.

3. A method in accordance with claim 2 in which said lug wires are spread by bending adjacent lug wires in substantially opposite directions.

4. A method for sealing an electric storage battery cell which comprises tightly sealing lug wires protruding from a top cover plate prior to filling the cell with alkaline electrolyte, filling the cell with the desired amount of alkaline electrolyte through a fill hole located in the top cover plate, and thereafter completely sealing the cell by introducing into the cell a sealant having a lower specific gravity than the alkaline electrolyte through said fill hole in the top cover plate.

References Cited by the Examiner

UNITED STATES PATENTS

| | | | |
|---|---|---|---|
| 1,178,066 | 4/1916 | Gardiner | 136—163 |
| 1,439,956 | 12/1922 | Fuld | 136—133 |
| 2,637,758 | 5/1953 | Shannon | 136—166.2 |

WINSTON A. DOUGLAS, *Primary Examiner.*

JOHN H. MACK, *Examiner.*